United States Patent
Huang

(10) Patent No.: US 11,929,625 B2
(45) Date of Patent: Mar. 12, 2024

(54) WIRELESS CHARGING HEARING AID

(71) Applicant: Zhengdong Huang, Yancheng (CN)

(72) Inventor: Zhengdong Huang, Yancheng (CN)

( * ) Notice: Subject to any disclaimer, the term of this patent is extended or adjusted under 35 U.S.C. 154(b) by 225 days.

(21) Appl. No.: 17/609,004

(22) PCT Filed: Jan. 21, 2020

(86) PCT No.: PCT/CN2020/073648
§ 371 (c)(1),
(2) Date: Nov. 5, 2021

(87) PCT Pub. No.: WO2020/238275
PCT Pub. Date: Dec. 3, 2020

(65) Prior Publication Data
US 2022/0216730 A1     Jul. 7, 2022

(30) Foreign Application Priority Data

May 27, 2019   (CN) .......................... 201910444159.5

(51) Int. Cl.
*H04R 25/00*      (2006.01)
*H02J 50/00*      (2016.01)
(Continued)

(52) U.S. Cl.
CPC ............ *H02J 50/005* (2020.01); *H02J 50/10* (2016.02); *H02J 50/70* (2016.02); *H04R 1/1025* (2013.01); *H04R 25/60* (2013.01)

(58) Field of Classification Search
CPC ........ H04R 9/06; H04R 1/105; H04R 1/1008; H04R 2225/025; H04R 25/505;
(Continued)

(56) References Cited

U.S. PATENT DOCUMENTS 8,644,543 B2*   2/2014  Lederer ................ H04R 25/456
                                                          381/322
9,661,426 B2*   5/2017  Ozden .................. H04R 25/505
(Continued)

FOREIGN PATENT DOCUMENTS

CN         205179365 U      4/2016
CN         107889554 A      4/2018
(Continued)

OTHER PUBLICATIONS

International Search Report issued in corresponding International application No. PCT/CN2020/073648, dated Apr. 17, 2020.
(Continued)

*Primary Examiner* — Disler Paul

(57) ABSTRACT

A wireless charging hearing aid is disclosed, comprising a housing, an inner housing, a power management module, a circuit board and a control button. An electromagnetic induction technology is utilized in the disclosed to obtain an inductive current for charging a built-in battery. Elements within the housing do not need to be in contact with an external charging joint, the sealing of the housing is better, thereby achieving complete waterproofing and dustproofing, and improving the adaptability when using the disclosed. Besides, shapes and the number of layers of a receiving coil are flexibly designed according to requirements, and a magnetic conductive sheet is used to shield an inductive magnetic field to prevent the inductive magnetic field negatively influencing other elements. The elements within the housing can be arranged arbitrarily, which improves the flexibility in designing an overall appearance, and facilitates to incorporate artistic designs while reduces the design difficulties.

5 Claims, 5 Drawing Sheets

(51) Int. Cl.
　　　*H02J 50/10*　　　(2016.01)
　　　*H02J 50/70*　　　(2016.01)
　　　*H04R 1/10*　　　(2006.01)
(58) Field of Classification Search
　　　CPC .. H04R 1/1066; H04R 25/60; H04R 2225/31;
　　　　　　H04R 2225/0216; H04R 2225/33; H04R
　　　　　　　　　　　　　　　　　　　　　　2225/0213
　　　USPC .................................................... 381/74, 322
　　　See application file for complete search history.

(56) References Cited

U.S. PATENT DOCUMENTS

| | | | |
|---|---|---|---|
| 10,218,223 B2 * | 2/2019 | Hatanaka | H02J 50/80 |
| 10,911,878 B2 * | 2/2021 | Higgins | H04R 25/604 |
| 11,399,244 B2 * | 7/2022 | Schmidt | H04R 1/1091 |
| 11,678,102 B2 * | 6/2023 | Li | H04R 1/1066 |
| | | | 381/74 |
| 2021/0152953 A1 * | 5/2021 | Sueyoshi | H01M 50/204 |

FOREIGN PATENT DOCUMENTS

| | | |
|---|---|---|
| CN | 208798225 U | 4/2019 |
| CN | 110149583 A | 8/2019 |
| JP | 2006174336 A | 6/2006 |

OTHER PUBLICATIONS

Written Opinion of the International Search Authority in corresponding International application No. PCT/CN2020/073648.

* cited by examiner

WIRELESS CHARGING HEARING AID

TECHNICAL FIELD

The present disclosure relates to the technical field of electronic devices, in particular to a wireless charging hearing aid.

BACKGROUND

A hearing aid is an electronic device that can improve a sound amplification function for hearing-impaired person. A wired charging is generally used in the existing hearing aid which is required to be equipped with a mechanical interface for charging. Although the charging interface is provided with a movable dustproof plug, the sealing performance thereof is still insufficient; it cannot be used normally on special occasions, such as swimming or in dusty construction site. On one hand, there are loud noises in these kinds of occasions, the hearing-impaired person deeply requires a hearing aid for normal communication, thus a hearing aid with better applicability is urgently needed. On the other hand, matters can enter the hearing aid through the charging interface, which also reduces the service life of the hearing aid.

Furthermore, the charging interface often needs to be embedded in a certain depth for fixing a charging joint, which greatly limits the flexiblilty of volume and shape design of the hearing aid. On one hand, the design difficulties of the shape and internal element arrangements are increased, and the design cost is increased. On the other hand, since internal parts need to avoid the built-in charging interface, the complexity of the arrangement structure is greatly increased, and the plugging and unplugging of the interface also increases mechanical wears, which reduces the reliability and stability of charging.

SUMMARY

In view of the disadvantages of the above-mentioned prior art, the present disclosure provides a wireless charging hearing aid, which has the advantages of non-contact and high efficiency, and can solve the disadvantages mentioned in the prior art.

The present disclosure provides a wireless charging hearing aid, which comprises a housing, an inner housing arranged on an inner surface of the housing, a power management module fitted at a side of the inner housing, a circuit board connected to the power management module, a control button movably connected to the circuit board, an ear hook arranged in the middle of the housing, and a sound output device connected to an end of the ear hook, wherein an upper portion of the power management module is equipped with a fixing plate, an upper end of the fixing plate is equipped with a magnetic conductive sheet, and an upper end of the magnetic conductive sheet is equipped with a receiving coil.

Preferably, the magnetic conductive sheet is made of material having magnetic conductivity, the shape and size of the magnetic conductive sheet is matched with that of the receiving coil, and the magnetic conductive sheet is parallel to the receiving coil.

Preferably, the receiving coil is tightly attached to the inner surface of the housing, and the magnetic conductive sheet is tightly attached to a side of the receiving coil away from the housing.

Preferably, the inner housing divides an inner cavity of the housing into a battery compartment and a power supply compartment, and the inner housing is connected with reinforcing ribs.

Preferably, the inside and outside of the housing are completely isolated, a side of the housing is equipped with the control button, and the control button is isolated from the circuit board through a protective film.

Preferably, the receiving coil is in different shapes, and the number of turns of the receiving coil is provided as multiple layers.

The present disclosure has the following beneficial effects:

The electromagnetic induction technology is utilized in the wireless charging hearing aid to obtain an inductive current for charging a built-in battery, internal elements of the housing do not need to be in contact with an external charging joint, so the sealing of the housing is better, thereby achieving complete waterproofing and dustproofing, and improving the adaptability when using the wireless charging hearing aid, which is convenient for the hearing impaired person to use the wireless charging hearing aid in various occasions. In addition, the inside of the housing is completely enclosed to isolate external impurities effectively, including water, dusts and corrosive gases, thus the overall service life has been improved.

Since the shapes and the number of layers of the receiving coil of the wireless charging hearing aid can be flexibly designed according to requirements, and a magnetic conductive sheet is used to shield an inductive magnetic field to prevent the inductive magnetic field negatively influencing other elements, so the elements within the housing can be arranged arbitrarily, which improves the flexibility in designing an overall appearance, and facilitates to incorporate artistic designs while reduces the design difficulties, thus the wireless charging hearing aid is more small, beautiful and matched with the users. Besides, the simplest and most reliable design schemes can be used by the internal parts in an easier manner, which can improve the overall design life. Moreover, non-contact charging can also reduce mechanical wears and further improve the overall service life.

Figure 1:
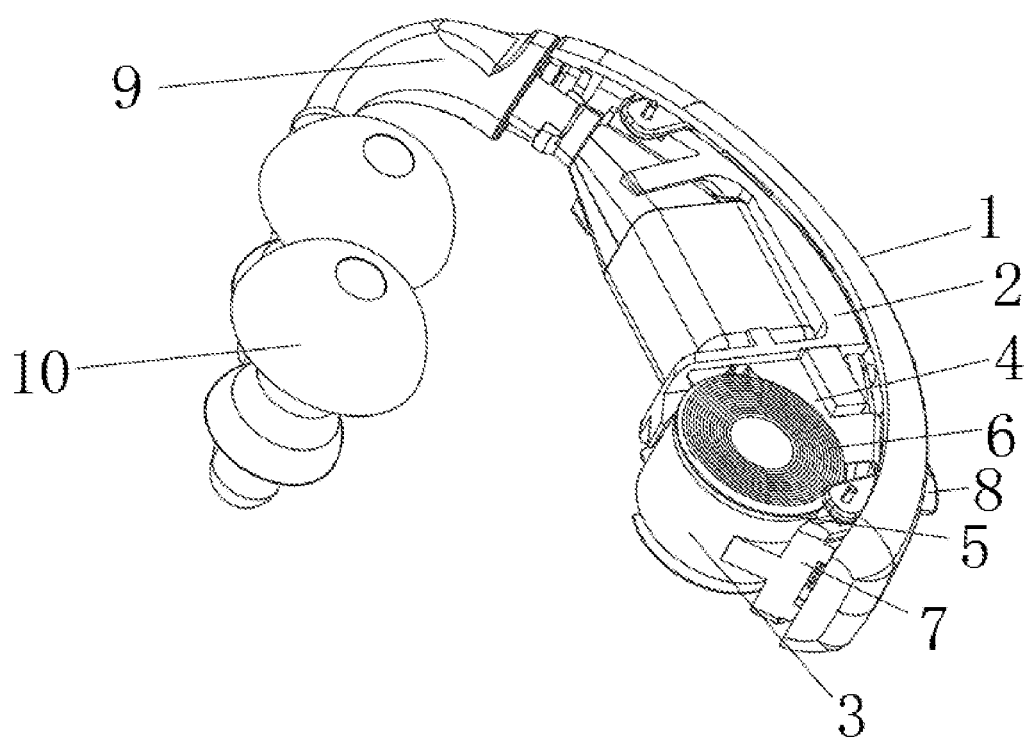
FIG. 1 is an internal structure view of the present disclosure.

The reference numerals in drawings are shown as below: housing 1, inner housing 2, power management module 3, fixing plate 4, magnetic conductive sheet 5, receiving coil 6, circuit board 7, control button 8, ear hook 9, sound output device 10.

DETAILED DESCRIPTION OF PREFERRED EMBODIMENTS

The technical solutions in the embodiments of the present disclosure will be clearly and completely described hereafter in conjunction with the accompanying drawings in the embodiments of the present disclosure. Obviously, the described embodiments are merely a part of the embodiments of the present disclosure, rather than all the embodiments. Based on the embodiments of the present disclosure, all other embodiments obtained by those of ordinary skill in the art without creative work shall fall within the protection scope of the present disclosure.

Figure 2:
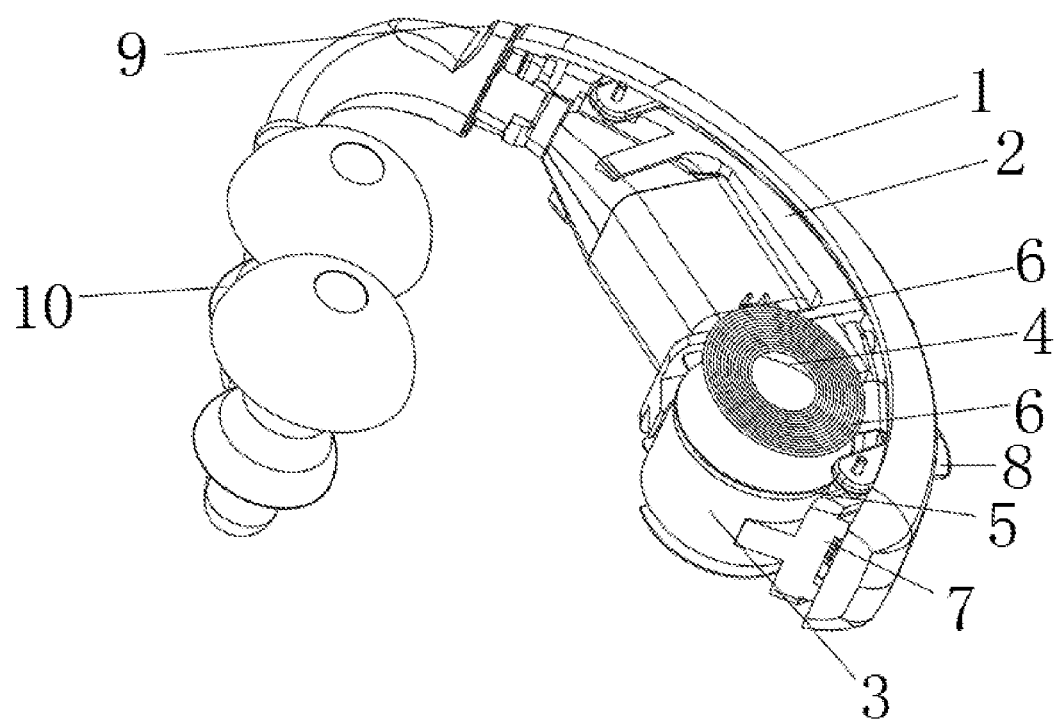
FIG. 2 is a schematic structural view of a magnetic conductive sheet according to the present disclosure.
Figure 3:
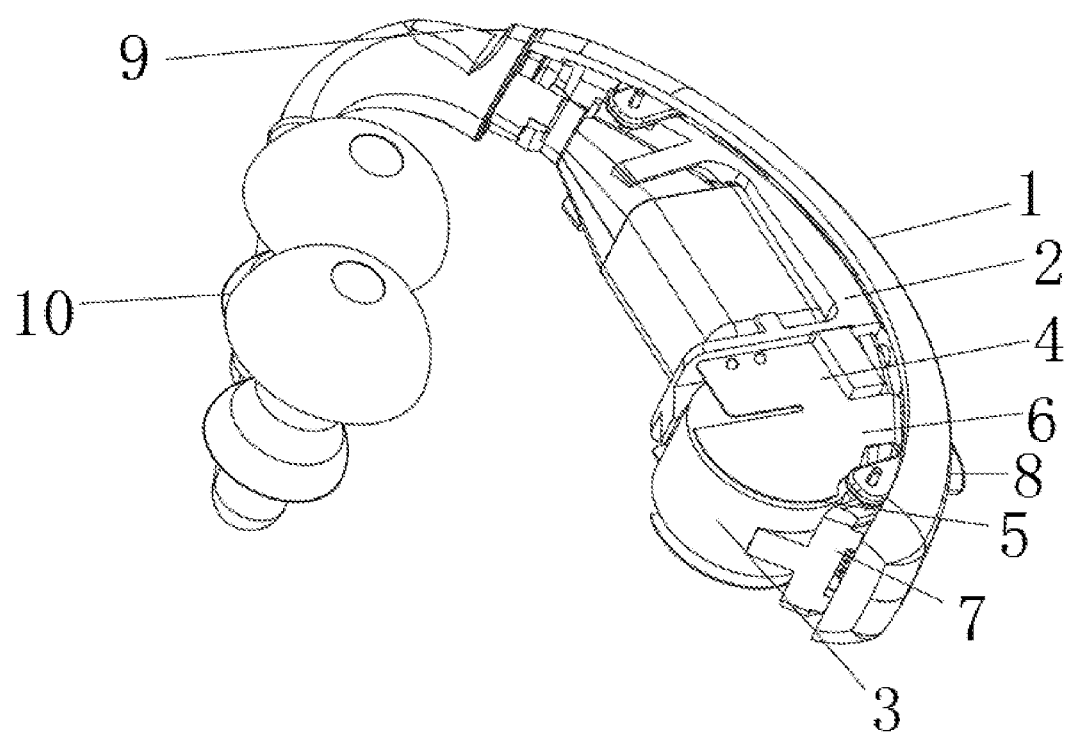
FIG. 3 is a schematic structural view of a fixing plate according to the present disclosure.
Figure 4:
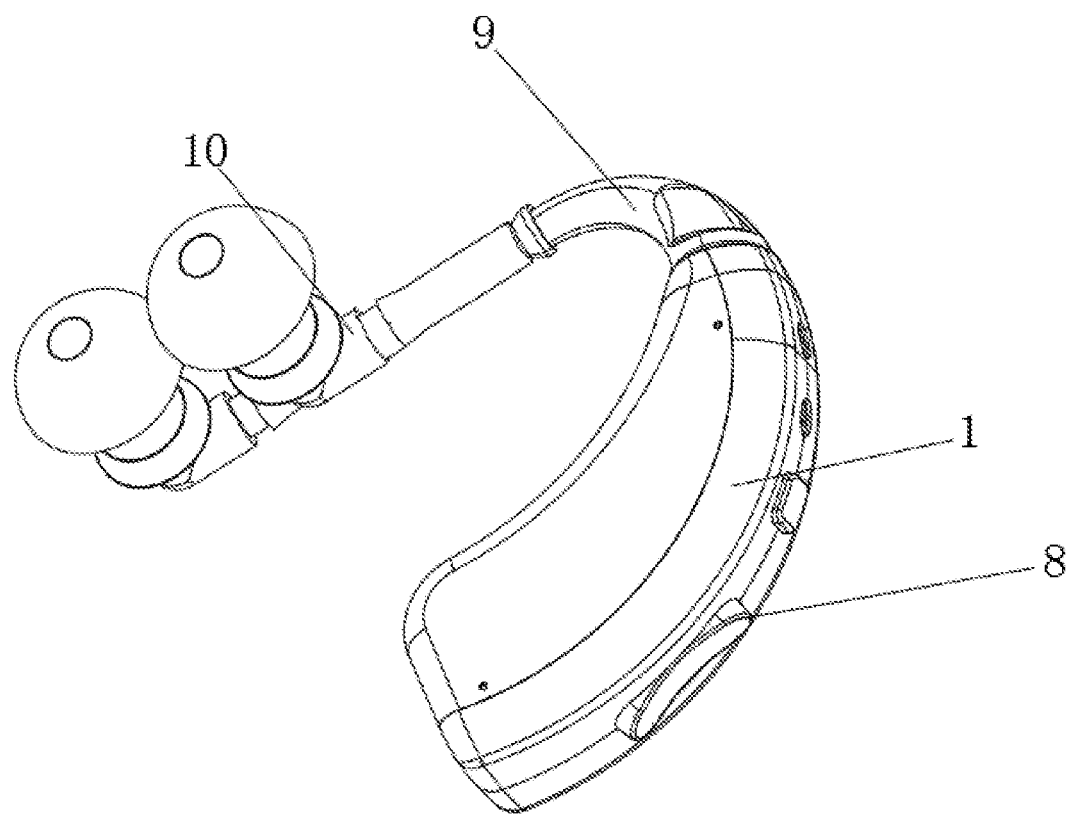
FIG. 4 is schematic perspective view of the present disclosure.
Figure 5:
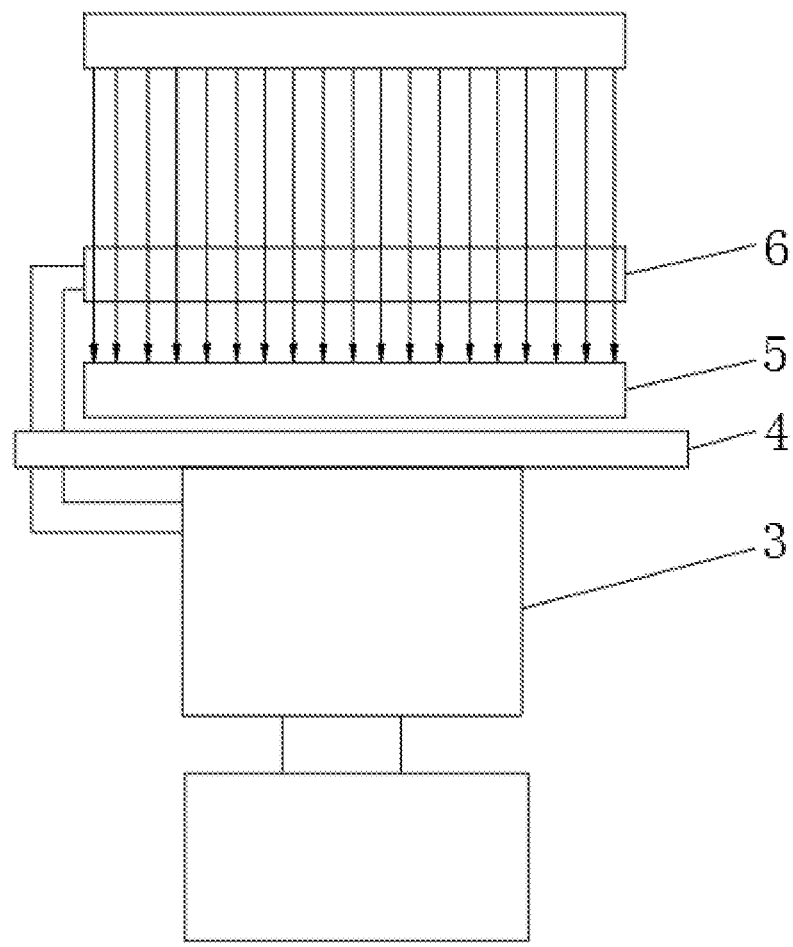
FIG. 5 is a schematic diagram of the present disclosure.
Figure 6:
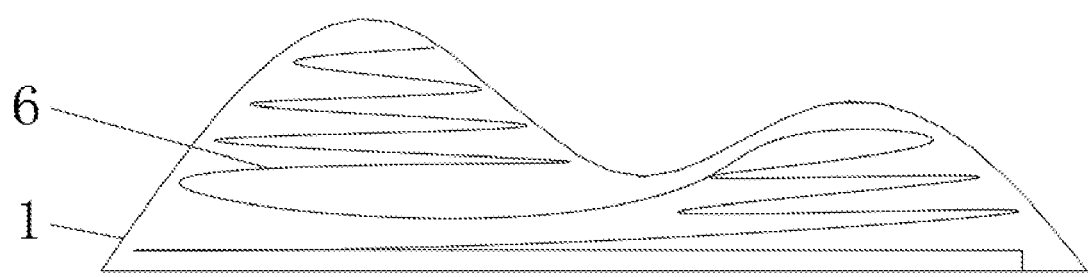
FIG. 6 is a schematic view of a special-shaped multilayer of a coil according to the present disclosure.

Please refer to FIG. 1 to FIG. 6, a wireless charging hearing aid comprises a housing 1, an inner housing 2 arranged on an inner surface of the housing 1, a power management module 3 fitted at a side of the inner housing 2, a circuit board 7 connected to the power management module 3, a control button 8 movably connected to the circuit board 7, an ear hook 9 arranged in the middle of the housing 1 and a sound output device 10 connected to an end of the ear hook 9. An upper end surface of the housing 1 is provided with a cover plate, the cover plate is connected with the housing 1 by screws, and the cover plate and the housing 1 are provided with a sealing ring. The inner housing 2 plays roles in fixing and protecting the internal elements. The power management module 3 processes the inductive current generated by the magnetic conductive sheet 5 and converts an alternating current into a direct current for sending to an internal battery for storage. An upper portion of the power management module 3 is equipped with a fixing plate 4, the fixing plate 4 is fixedly connected to the inner housing 2, and the power management module 3 is fixedly arranged on an upper surface of the fixing plate 4. An upper end of the fixing plate 4 is equipped with the magnetic conductive sheet 5, and the fixing plate 4 supports the magnetic conductive sheet 5. An upper end of the magnetic conductive sheet 5 is equipped with a receiving coil 6, and two-stage conductive wires of the receiving coil 6 go around a side of the magnetic conductive sheet 5 and penetrate through the fixing plate 4 to be electrically connected to the power management module 3.

The magnetic conductive sheet 5 is made of material having magnetic conductivity, and the magnetic conductive sheet 5 shields an inductive magnetic field. Shape and size of the magnetic conductive sheet 5 are matched with that of the receiving coil 6, an area of the magnetically sheet 5 is slightly larger than that of the receiving coil 6, and a vertical projection of the receiving coil 6 is completely located within the magnetic conductive sheet 5. The magnetic conductive sheet 5 is parallel to the receiving coil 6, since a direction of the magnetic field is perpendicular to the coil 6, an angle formed between the direction of the magnetic field and the magnetic conductive sheet 5 is avoided, thus the magnetic field is prevented from overflowing from a side.

The receiving coil 6 is tightly attached to an inner surface of the housing 1, the magnetic conductive sheet 5 is tightly attached to a side of the receiving coil 6 away from the housing 1, that is, the magnetic field exists only on surfaces of an external transmitting coil, the internal receiving coil 6 and the magnetic conductive sheet 5, and the inductive magnetic field is completely shielded, thereby avoiding that the inductive magnetic field effects the internal elements.

The inner housing 2 divides an inner cavity of the housing 1 into a battery compartment and a power supply compartment for fixing a battery and the power management module 3 respectively to reduce their vibrations. The inner housing 2 is connected with reinforcing ribs for increasing the strength of the housing 1 and reducing deformations.

The inside and outside of the housing 1 are completely isolated, a side of the housing 1 is equipped with the control button 8, and the control button 8 is isolated from the circuit board 7 through a protective film, which can further increase the internal sealing of the housing 1.

The receiving coil 6 is in different shapes, and the number of turns of the receiving coil 6 is provided as multilayer. The shapes and number of layers of the receiving coil 6 can be flexibly designed according to the requirements. When a small and beautiful hearing aid is pursued, the receiving coil 6 can be designed to be matched with an appearance to increase the utilization of space, and the number of the layers is increased to ensure the charging efficiency. If a reliable and lower production cost is pursued, the receiving coil 6 can be designed as a simple circular single layer.

The working principles of the wireless charging hearing aid are that:

When charging the wireless charging hearing aid, the transmitting coil generates a changeable magnetic field, the receiving coil 6 is located within the changeable inductive magnetic field and generates an inductive current. The inductive current is transmitted to the power management module 3 through the two-stage wires, and the power management module 3 changes an AC current of the inductive current into a DC current and then sends the DC current to a rechargeable battery for charging the battery. Meanwhile, since the direction of the magnetic field is perpendicular to the direction of the receiving coil 6, the transmitting coil, the receiver coil 6 and the magnetic sheet 5 are horizontal to each other, and the transmitting coil and the receiving coil 6 can be completely projected within the magnetic conductive sheet 5, the magnetic conductive sheet 5 can completely shield the inductive magnetic field, thereby avoiding that the magnetic field has negative influences on other elements.

It should be noted that, in the present disclosure, the relational terms such as first and second are only used to distinguish one from another entity or operation without necessarily requiring or implying any actual such relationship or order between such entities or operations. Besides, the terms "include", "comprise" or any other variants thereof are intended to cover non-exclusive inclusion, so that a process, method, article or device of including a series of elements not only includes those elements, but also includes other elements that are not explicitly listed, or also includes the elements inherent to the process, method, article or device.

Although the embodiments of the present disclosure have been illustrated and described, those of ordinary skill in the art should understand that various changes, modifications, substitutions and variations can be made to these embodiments without departing from the principles and spirits of the present disclosure, and the scope of the present disclosure is defined by the append portioned claims and their equivalents.

What is claimed is:

1. A wireless charging hearing aid, comprising: a housing (1), an inner housing (2) arranged on an inner surface of the housing (1), a power management module (3) fitted at a side of the inner housing (2), a circuit board (7) connected to the power management module (3), a control button (8) movably connected to the circuit board (7), an ear hook (9) arranged in the middle of the housing (1), and a sound output device (10) connected to an end of the ear hook (9), wherein an upper portion of the power management module (3) is equipped with a fixing plate (4), an upper end of the fixing plate (4) is equipped with a magnetic conductive sheet (5), and an upper end of the magnetic conductive sheet (5) is equipped with a receiving coil;

wherein the inner housing (2) divides an inner cavity of the housing (1) into a battery compartment and a power supply compartment, and the inner housing (2) is connected with reinforcing ribs.

2. The wireless charging hearing aid according to claim 1, wherein the magnetic conductive sheet (5) is made of material having magnetic conductivity, the shape and size of the magnetic conductive sheet (5) are matched with that of the receiving coil (6), and the magnetic conductive sheet (5) is parallel to the receiving coil (6).

3. The wireless charging hearing aid according to claim 1, wherein the receiving coil (6) is tightly attached to the inner surface of the housing (1), and the magnetic conductive sheet (5) is tightly attached to a side of the receiving coil (6) away from the housing (1).

4. The wireless charging hearing aid according to claim 1, wherein the inside and outside of the housing (1) are completely isolated, a side of the housing (1) is equipped with the control button (8), and the control button (8) is isolated from the circuit board (7) through a protective film.

5. The wireless charging hearing aid according to claim 1, wherein the receiving coil (6) is in different shapes, and the number of turns of the receiving coil (6) is provided as multilayer.

\* \* \* \* \*